United States Patent
Zhang et al.

(10) Patent No.: US 10,620,846 B2
(45) Date of Patent: Apr. 14, 2020

(54) ENHANCING FLASH TRANSLATION LAYER TO IMPROVE PERFORMANCE OF DATABASES AND FILESYSTEMS

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 165 days.

(21) Appl. No.: 15/726,839

(22) Filed: Oct. 6, 2017

(65) Prior Publication Data

US 2018/0113631 A1    Apr. 26, 2018

Related U.S. Application Data (60) Provisional application No. 62/413,175, filed on Oct. 26, 2016.

(51) Int. Cl.
    *G06F 3/00* (2006.01)
    *G06F 3/06* (2006.01)
    *G06F 12/02* (2006.01)

(52) U.S. Cl.
    CPC ............ *G06F 3/0613* (2013.01); *G06F 3/064* (2013.01); *G06F 3/0658* (2013.01); *G06F 3/0679* (2013.01); *G06F 3/0688* (2013.01); *G06F 12/0246* (2013.01); *G06F 3/065* (2013.01); *G06F 2212/1024* (2013.01); *G06F 2212/1041* (2013.01); *G06F 2212/2022* (2013.01); *G06F 2212/7201* (2013.01)

(58) Field of Classification Search
    None
    See application file for complete search history.

(56) References Cited

U.S. PATENT DOCUMENTS

| | | | |
|---|---|---|---|
| 6,021,468 A * | 2/2000 | Arimilli | G06F 12/0811 711/122 |
| 2013/0111471 A1* | 5/2013 | Chandrasekaran | G06F 9/455 718/1 |
| 2014/0006362 A1* | 1/2014 | Noronha | G06F 3/0641 707/692 |

(Continued)

*Primary Examiner* — David Yi
*Assistant Examiner* — Craig S Goldschmidt
(74) *Attorney, Agent, or Firm* — Hoffman Warnick LLC (57) ABSTRACT

An enhanced FTL system and method are provided for eliminating redundant write operations. A method is disclosed, including: processing a data write operation from a host that deploys a journaling scheme, wherein the data write operation includes a specified LBA that maps to a PBA in a SSD memory; calculating a signature of a data block during a write operation; detecting whether the data write should be handled as journal or non-journal write operation without assistance from the host; in response to a detected journal write operation, allocating a new PBA, writing the data block to the new PBA, updating a mapping table with a new LBA-PBA mapping, and inserting the signature into a signature table for the new LBA-PBA mapping; and in response to a detected non-journal write operation, mapping the specified LBA to an existing PBA if the signature matches a stored signature in the mapping table.

14 Claims, 9 Drawing Sheets

(56) References Cited

U.S. PATENT DOCUMENTS

| | | | |
|---|---|---|---|
| 2014/0189211 A1* | 7/2014 | George | G06F 3/0613 |
| | | | 711/103 |
| 2017/0357592 A1* | 12/2017 | Tarasuk-Levin | G06F 12/1009 |
| 2017/0371781 A1* | 12/2017 | Choi | G06F 12/0253 |

* cited by examiner

ENHANCING FLASH TRANSLATION LAYER TO IMPROVE PERFORMANCE OF DATABASES AND FILESYSTEMS

PRIORITY

This application claims priority to provisional application "ENHANCING FLASH TRANSLATION LAYER TO IMPROVE PERFORMANCE OF DATABASES AND FILESYSTEMS" filed on Oct. 26, 2016, Ser. No. 62/413,175.

TECHNICAL FIELD

The present invention relates to the field of databases and filesystems, and particularly to improving the operational throughput and storage efficiency of databases and filesystems.

BACKGROUND

Many applications, in particular databases and filesystems, are expected to guarantee data write transaction atomicity, i.e., if one part of the transaction fails, then the entire transaction fails, and the database/filesystem state remains unchanged. To ensure the atomicity, databases and filesystems typically deploy either a journaling or copy-on-write scheme.

When the journaling scheme is being used, the data to be committed into databases/filesystems are first written to a dedicated journal region on the storage device, and then written to the target location inside databases/filesystems. As a result, the same content are written to data storage devices twice. The journal region typically occupies a continuous space on the data storage devices. Hence, journaling typically incurs sequential writes to the data storage devices (i.e., multiple data blocks are consecutively written to a continuous storage space on the data storage device). Meanwhile, the data written to the target location inside databases/filesystems could scatter throughout the entire storage space, leading to random writes to the data storage device. Therefore, although the use of journaling doubles the size of data being physically written to the data storage device, the impact on the overall database/filesystem performance depends on the performance difference between sequential write and random write of the data storage device. When hard disk drives (HDDs) are used, journaling may incur very small or even negligible performance penalty since HDDs perform sequential writes much faster than random writes. However, when solid-state drives (SSDs) are used, journaling could cause significant performance penalty, since the performance of sequential write and random write performance does not largely differ on SSDs, especially in the presence of a large number of write requests.

For databases/filesystems that deploy the copy-on-write scheme, data on the storage devices are never updated-in-place. Instead, databases/filesystems write the updated data to a new location on the storage device, and accordingly update the metadata to record the change. Although copy-on-write avoids doubling data write size as in the case of journaling, a large amount of stale data could scatter throughout the storage space as the copy-on-write process continues. This will cause significant storage device fragmentation, leading to storage device performance degradation. To mitigate this effect, garbage collection (GC) should be invoked periodically to re-arrange the data placement and hence reduce the fragmentation of the storage device. For both HDDs and SSDs, GC incurs a large number of data I/O operations, leading to noticeable performance penalty.

In summary, when SSDs are being used, both journaling and copy-on-write tend to cause significant system performance penalty at the cost of ensuring write atomicity. This problem has been well recognized, and a variety of solutions have been developed to address this problem. Regardless of the specific design techniques, all the existing solutions demand the change/modification of the databases/filesystems source code. This unfortunately leads to a very high barrier for these solutions to be adopted in practice. Hence, it is highly desirable to have a design solution that can adequately address the copy-on-write/journaling-induced performance penalty without demanding any changes/modifications of the databases/filesystems source code.

SUMMARY

Accordingly, embodiments of the present disclosure are directed to solutions for reducing copy-on-write/journaling-induced performance penalties without demanding any changes/modifications of the databases/filesystem source code.

In a first aspect, a controller is provided having an enhanced flash translation layer (FTL) for processing data transfers between a host that deploys a journaling scheme and a solid state drive (SSD) memory, wherein each data transfer includes a specified logical block address (LBA) that maps to a physical block address (PBA), comprising: a signature calculation system that calculates a signature of a data block during a data write operation; a journal write detection system that detects whether the data write operation should be handled as a journal or non-journal write operation; a journal write handling system that, in response to a detected journal write operation, allocates a new PBA, writes the data block to the new PBA, updates a mapping table with a new LBA-PBA mapping, and inserts the signature into a signature table for the new LBA-PBA mapping; and a non-journal write handling system that, in response to a detected non-journal write operation, maps the specified LBA to an existing PBA if the signature matches a stored signature in the mapping table.

In a second aspect, a method of implementing an enhanced flash translation layer (FTL) is provided, comprising: processing a data write operation from a host that deploys a journaling scheme, wherein the data write operation includes a specified logical block address (LBA) that maps to a physical block address (PBA) in a solid state drive (SSD) memory; calculating a signature of a data block during a write operation; detecting whether the data write should be handled as a journal or non-journal write operation without assistance from the host; in response to a detected journal write operation, allocating a new PBA, writing the data block to the new PBA, updating a mapping table with a new LBA-PBA mapping, and inserting the signature into a signature table for the new LBA-PBA mapping; and in response to a detected non-journal write operation, mapping the specified LBA to an existing PBA if the signature matches a stored signature in the mapping table.

In a third aspect, a controller having an enhanced flash translation layer (FTL) for processing data transfers between a host that deploys a copy-on-write scheme and a solid state drive (SSD) memory, wherein each data transfer includes a specified logical block address (LBA) that maps to a physical block address (PBA), comprising: a signature calculation system that calculates a signature of a data block during a data write; a signature matching system that determines if the signature exists in a signature table; a remapping system that remaps the specified LBA to an existing PBA in response to a signature match; and a memory allocation system that, in response to no signature match, allocates a new PBA, writes the data block into the new PBA and updates the mapping table to map the specified LBA into the new PBA.

In a fourth aspect, a method is provided for implementing an enhanced flash translation layer (FTL) for processing data transfers between a host that deploys a copy-on-write scheme and a solid state drive (SSD) memory, wherein each data transfer includes a specified logical block address (LBA) that maps to a physical block address (PBA), comprising: calculating a signature of a data block during a data write; determining if the signature exists in a signature table; remapping the specified LBA to an existing PBA in response to a signature match; and in response to no signature match, allocating a new PBA, writing the data block into the new PBA and updating the mapping table to map the specified LBA into the new PBA.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
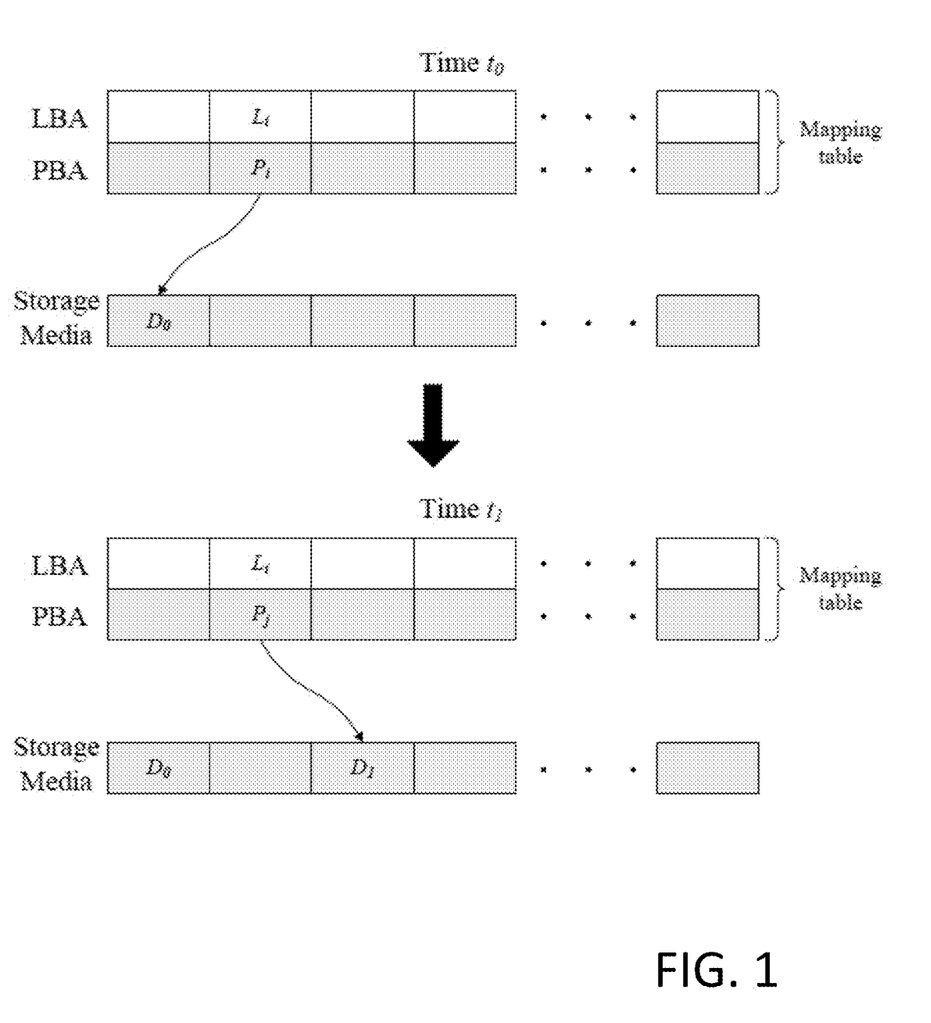
FIG. 1 illustrates an example that FTL manages the LBA-PBA mapping.

Solid state devices (SSDs) internally manage data on their physical storage media (i.e., flash memory chips) in the unit of constant-size (e.g., 4 k-byte) sectors. Each physical sector is assigned with one unique physical block address (PBA). Instead of directly exposing the PBAs to external hosts, SSDs expose an array of logical block address (LBA) and internally manage/maintain an injective mapping between an LBA and PBA. The software component responsible for managing the LBA-PBA mapping is called a flash translation layer (FTL). Since NAND flash memory does not support update-in-place, data update/rewrite to one LBA will trigger a change of the LBA-PBA mapping (i.e., the same LBA is mapped with another PBA to which the new data are physically written). For example, as shown in FIG. 1, at the time to, the LBA $L_i$ associates with the PBA $P_i$ that stores the data $D_0$. If the application writes new content $D_1$ to the LBA $L_i$ later at the time $t_1$, SSD must allocate another available physical sector with the PBA $P_j$ to store the new content $D_1$, and accordingly the FTL changes the LBA-PBA mapping from $L_i$-$P_i$ to $L_i$-$P_j$. The original data $D_0$ being stored at the PBA $P_i$ are marked as stale but not immediately erased. The storage space at PBA $P_i$ will be reclaimed and reused at a later time.

Figure 2:
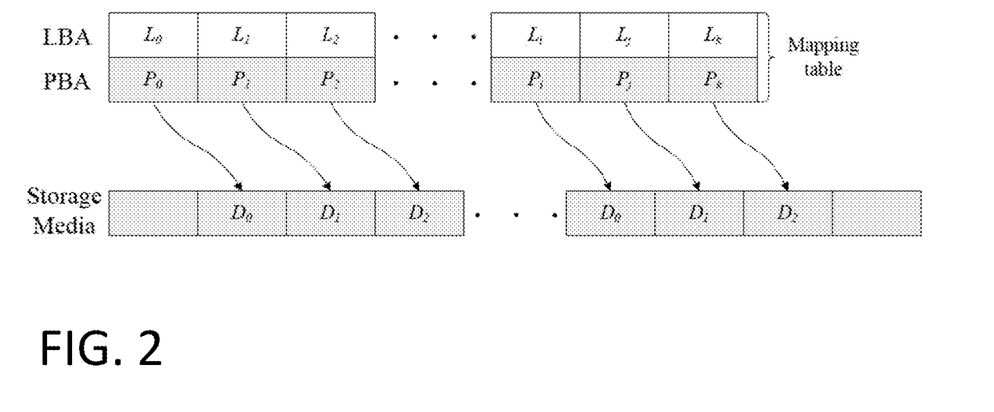
FIG. 2 illustrates the journaling-induced doubled data write for atomicity in current practice.

When databases/filesystems use journaling to ensure write atomicity, they first write data to a dedicated journal region on the storage device through a sequential write (i.e., writing multiple data blocks consecutively to multiple continuous LBAs), then write data to the target location inside databases/filesystems. Once the data have been successfully written to the target location inside databases/filesystems on the storage device, the data being stored in the journal region are no longer useful. Therefore, the dedicated journal region typically has very small size (e.g., a few MBs) and occupies a fixed range of LBAs on the storage devices. As shown in FIG. 2, when databases/filesystems should write three data sectors $D_0$, $D_1$, and $D_2$ to the LBAs $L_i$, $L_j$, and $L_k$, they first write them to the journal region with the continuous LBAs $L_0$, $L_1$, and $L_2$. As shown in FIG. 2, the LBAs $L_0$, $L_1$, and $L_2$ associate with PBAs $P_0$, $P_1$, and $P_2$, i.e., data $D_0$, $D_1$, and $D_2$ are physically written to three sectors on the storage device at the PBAs of $P_0$, $P_1$, and $P_2$. After the data $D_0$, $D_1$, and $D_2$ have been successfully written to the journal region, they are then written to the target LBAs $L_i$, $L_j$, and $L_k$. In current practice, the FTL manages the LBA-PBA mapping in such a way that different LBAs always map to different PBAs, i.e., one PBA cannot be mapped with multiple LBAs. Hence, as shown in FIG. 2, the data $D_0$, $D_1$, and $D_2$ are physical written to the storage devices at the PBAs $P_i$, $P_j$, and $P_k$, which are mapped with the LBAs $L_i$, $L_j$, and $L_k$. As a result, the same content $D_0$, $D_1$, and $D_2$ are physically written twice to the storage device. This directly leads to a significant system performance penalty.

Figure 3:
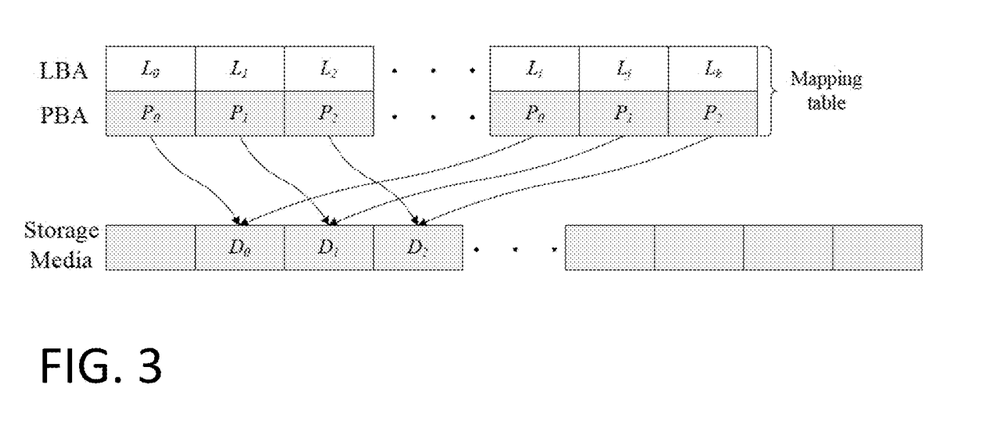
FIG. 3 illustrates the enhanced FTL can eliminate the redundant write through LBA-PBA mapping management.

Aiming to eliminate redundant data writes without demanding any changes of databases/filesystems source code, a present solution enhances the FTL with the following two capabilities: (1) the FTL is able to identify the redundant write operation, i.e., a write operation writing the same content that has been already written to the journal region; and (2) the FTL is able to manage/maintain a mapping table in which multiple LBAs can be mapped to the same PBA. With these two capabilities, the FTL can readily eliminate the redundant writes and hence improve the overall system performance. As shown in FIG. 3, when databases/filesystems should write three data sectors $D_0$, $D_1$, and $D_2$ to the LBAs $L_i$, $L_j$, and $L_k$, they first write them to the journal region with the continuous LBAs $L_0$, $L_1$, and $L_2$. As shown in FIG. 3, the LBAs $L_0$, $L_1$, and $L_2$ associate with PBAs $P_0$, $P_1$, and $P_2$, i.e., data $D_0$, $D_1$, and $D_2$ are physically written to the storage devices at the PBAs of $P_0$, $P_1$, and $P_2$. After the data $D_0$, $D_1$, and $D_2$ have been successfully written to the journal region, they are then written to the target LBAs $L_i$, $L_j$, and $L_k$. The enhanced FTL is able to detect that the data $D_0$ being written to the LBA $L_i$ is identical to the data being stored at the PBA $P_0$. Hence, the FTL simply updates the mapping table to map LBA $L_i$ with PBA $P_0$, as shown in FIG. 3, without physically writing $D_0$ again. In the same way, the enhanced FTL maps LBA $L_j$ with PBA $P_1$, and LBA $L_k$ with PBA $P_2$, without physically writing $D_1$ and $D_2$ again.

Figure 4:
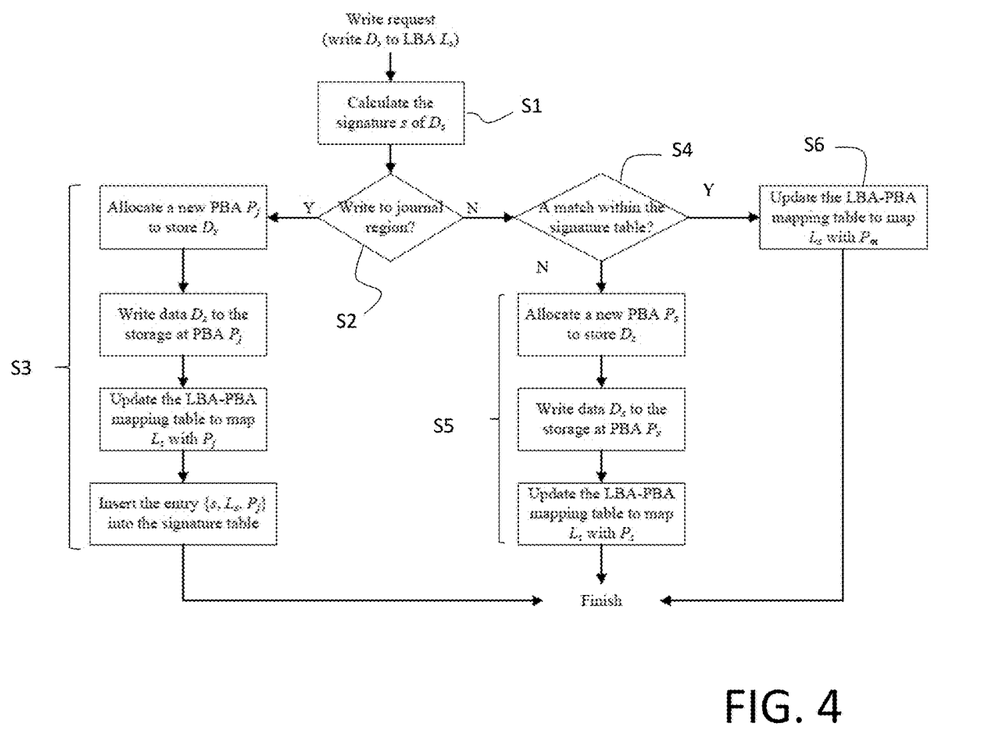
FIG. 4 illustrates the data flow diagram of the enhanced FTL for eliminating the journaling-induced redundant write.

FIG. 4 shows the flow diagram of the enhanced FTL on eliminating the redundant write. The FTL maintains a very small signature table (e.g., 512 entries), in which each entry contains an LBA, the signature of the data being stored at this LBA, and the corresponding PBA. Although the data being stored at each LBA has large size (e.g., 4 kB), its signature has very small size, e.g., 16 B or 20 B. The signature can be obtained by hashing (e.g., SHA-1) and must ensure a sufficiently low probability (e.g., $10^{-20}$ and below) that two sectors with the same signature do not have the identical content.

As shown in FIG. 4, upon a write request that writes data $D_s$ to a specified LBA $L_s$, FTL first calculates the signature (denoted as s) of its content at S1, and subsequently determines at S2 whether the write operation is a write to the journal region. If yes, then at S3, the FTL allocates an available sector with the PBA $P_j$, writes the incoming data to $P_j$, and updates the LBA-PBA mapping table to map $L_s$ with $P_j$. In addition, FTL calculates the signature s of this data, and inserts the signature with the LBA-PBA mapping $\{s, L_s, P_j\}$ as a new entry to the signature table, which may replace an old entry due to the very small size of the signature table.

If no at S2, the FTL performs a look-up to determine if there is a match within the signature table at S4. If there is a signature match (i.e., the signature of one existing entry in the table is identical to s) in which $L_m$ and $P_m$ denote the LBA and PBA of this matching entry, then the FTL directly updates the LBA-PBA mapping table to map $L_s$ with $P_m$ without physically writing the data to flash memory at S6. In other words, the specified LBA $L_m$ is simply mapped to existing PBA $P_m$. Otherwise if no signature matching is found at S4, then at S5 the FTL allocates an available sector with a new PBA $P_s$, writes the incoming data to $P_s$, and updates the LBA-PBA mapping table to map the specified LBA $L_s$ with the new PBA $P_s$.

To practically implement the process as shown in FIG. 4, the FTL must determine whether the incoming write request should target the journal region or not at S2. If the incoming write request targets the journal region, then the FTL inserts a new entry to its signature table; otherwise the FTL searches for a possible signature match against the signature table. In order to effectively address this challenge, the present solution exploits the following two unique characteristics of data journaling in databases/filesystems: (1) the data are written to the journal region through a sequential write (i.e., multiple data blocks are written to a continuous storage space), and (2) the journal region typically occupies a continuous and fixed range of LBAs. Two illustrative strategies to practically exploit these two characteristics are as follows.

Figure 5:
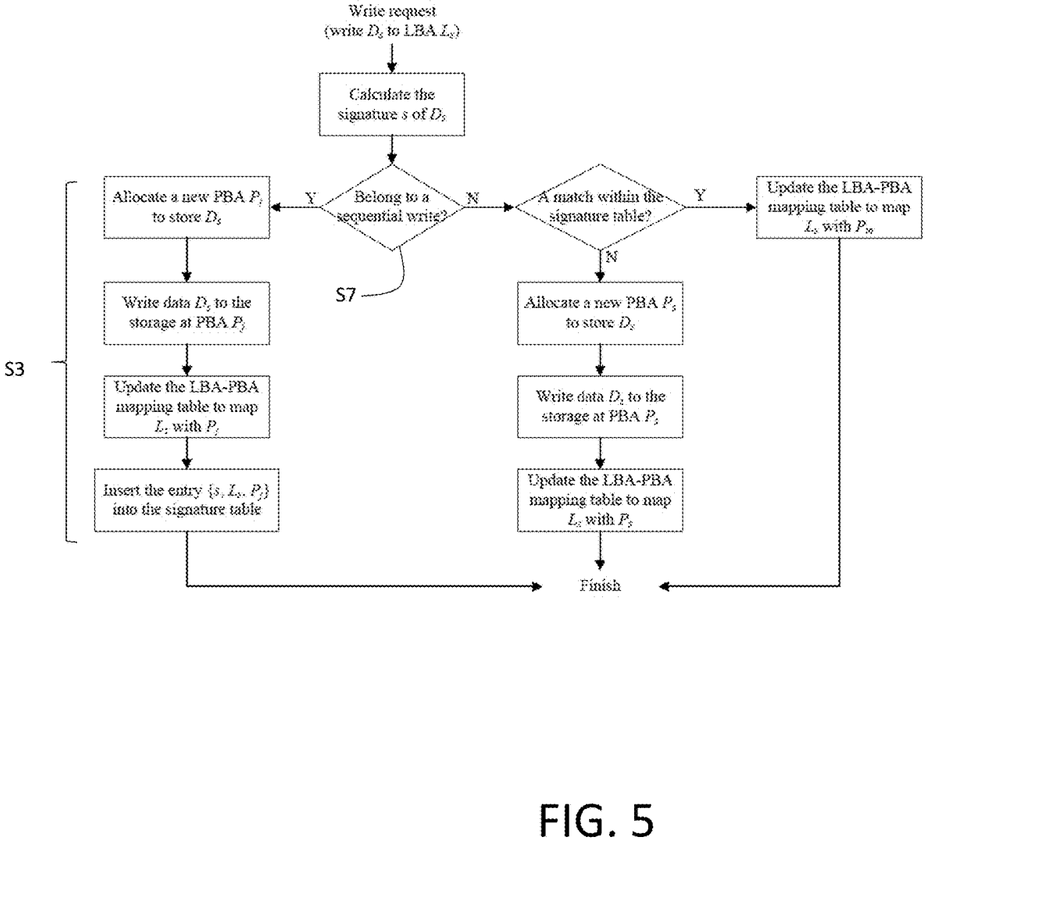
FIG. 5 illustrates the data flow diagram of the enhanced FTL that uses write pattern based scheme to detect whether a write request targets at the journal region.

The first design solution employs a write pattern based scheme, and its flow diagram is shown in FIG. 5. Since data are written to the journal region through a sequential write, the FTL simply assumes all the sequential writes target the journal region. As shown in FIG. 5, a determination is made whether the write is a sequential write at S7. If the FTL receives a sequential write with a number of continuous LBAs, it inserts all the data associated with the sequential write into its signature table at S3 as describe in FIG. 4. If no at S7, then a determination is whether a match exists as described in FIG. 4.

Figure 6:
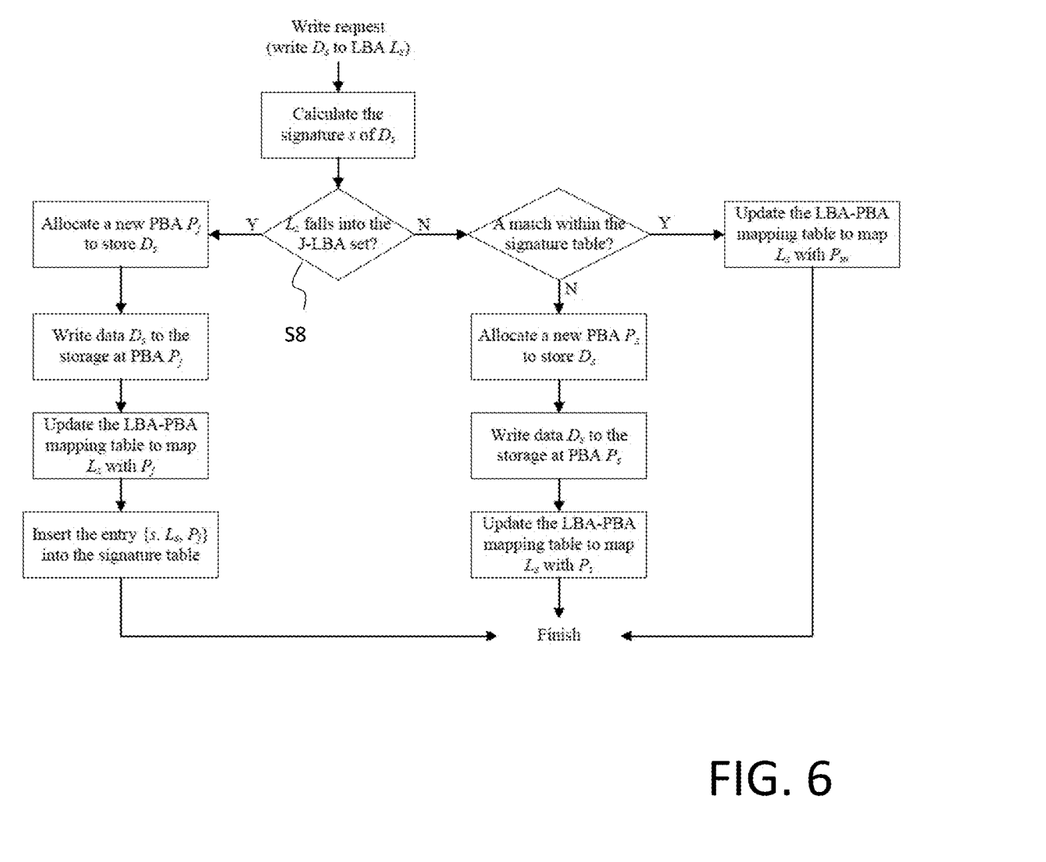
FIG. 6 illustrates the data flow diagram of the enhanced FTL that uses LBA range based scheme to detect whether a write request targets at the journal region.

The second design solution employs a write LBA range based scheme, and its flow diagram is shown in FIG. 6. Since the journal region has a continuous and fixed range of LBAs, FTL first infers its range of LBAs, referred to as J-LBA set. As shown, upon an incoming write request D with the LBA of $L_i$, FTL first checks whether $L_i$ falls inside the J-LBA set at S8. If $L_i$ indeed falls insides the J-LBA set, FTL calculates the signature s of the incoming data D, allocates an available physical sector at PBA $P_i$ to store the data, and inserts the entry $\{s, L_i, P_i\}$ into the small signature table. One challenge to practically implement this design solution is how FTL determines the J-LBA set. Two illustrative solutions to address this challenge are described:

1. The first solution aims to explicitly discover the J-LBA set through data structure analysis: For each given database/filesystem, the FTL is enhanced so that it can directly analyze the data structure of the database/filesystem and hence detect the LBAs of the dedicated journal region in that database/filesystem. This demands the enhanced FTL is fully aware of the data structure and organization of that specific database/filesystem. Although this approach can most accurately obtain the J-LBA set, it could make the software development very complicated.
2. The second solution aims to approximately estimate the J-LBA set through on-line learning: After the databases/filesystems have been installed and started to operate, the FTL monitors the data write requests over a certain period and keeps the record of the LBA range of each sequential write. After monitoring a sufficiently large number of write requests, the FTL chooses the LBA range with the highest occurrence frequency as the J-LBA set. This on-line learning process can be invoked from time to time. Although this approach may not most accurately discover the entire J-LBA set, it can be very easily implemented with minimal overhead.

When databases/filesystems deploy the copy-on-write scheme to ensure write atomicity, they always write the updated data sector to a new LBA instead of writing to the same LBA, and meanwhile mark the previous LBA as a stale sector. Although copy-on-write avoids the doubled data write size as in the case of journaling, a large number of stale data could scatter throughout the storage device as the copy-on-write process continues. This will cause significant storage device fragmentation, leading to storage device performance degradation. To mitigate this effect, databases/filesystems use garbage collection (GC) to re-arrange the data placement and hence reduce the fragmentation of the storage device.

Figure 7:
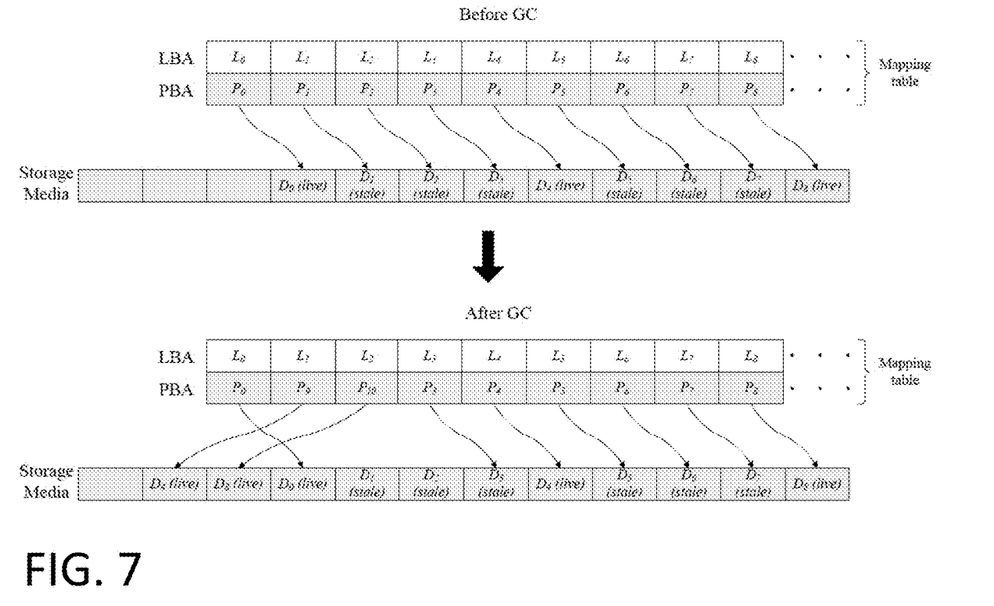
FIG. 7 illustrates the GC-induced write redundancy when using copy-on-write to ensure atomicity in current practice.

For example, as shown in FIG. 7, LBAs $L_0$, $L_4$, and $L_8$ store three live data sectors $D_0$, $D_4$, and $D_8$, while LBAs $L_1$, $L_2$, $L_3$, $L_5$, $L_6$, and $L_7$ store six stale data sectors. The GC process aims to move all the live data sectors to continuous LBAs, e.g., move $D_4$ from LBA $L_4$ to the LBA $L_1$, and $D_8$ from LBA $L_8$ to the LBA $L_2$. In current practice, when writing $D_4$ and $D_8$ to LBA $L_1$ and $L_2$, the FTL must allocate two new PBAs in the storage device and physically write the data $D_4$ and $D_8$ to the two physical locations, as shown in FIG. 7. Since the content $D_4$ and $D_8$ already reside in the storage device, these two write operations in GC process are essentially redundant.

The present approach eliminates redundant data writes caused by GC, without demanding any changes of databases/filesystems source code. This approach enhances the FTL with the following two capabilities: (1) the FTL is able to identify the GC-induced redundant write operation, i.e., GC process is trying to copy one data sector from one LBA to another LBA; and (2) the FTL is able to manage/maintain a mapping table in which multiple LBAs can be mapped to the same PBA. With these two capabilities, the FTL can readily eliminate the redundant write and hence improve the overall system performance.

Figure 8:
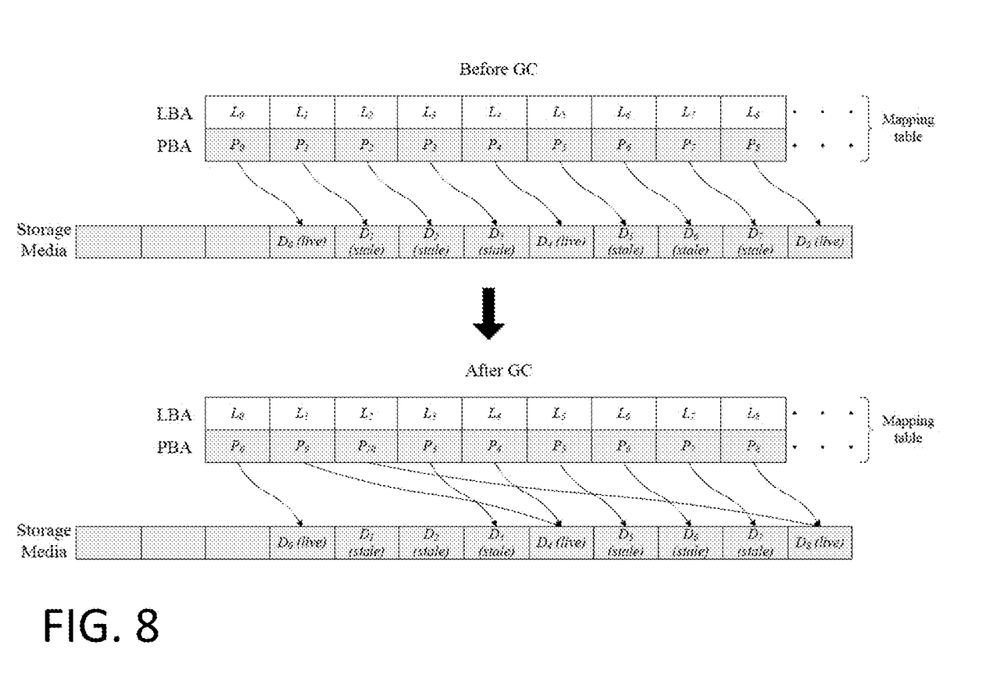
FIG. 8 illustrates the enhanced FTL can eliminate the GC-induced redundant write through LBA-PBA mapping management.

As shown in FIG. 8, when a GC process copies the data $D_4$ and $D_8$ to LBA $L_1$ and $L_2$, the enhanced FTL is able to detect that the data $D_4$ and $D_8$ are identical to the data being stored at the PBA $P_4$ and $P_8$. Hence, the FTL simply updates the mapping table to map specified LBA $L_1$ with existing PBA $P_4$, and map specified LBA $L_2$ with existing PBA $P_8$, as shown in FIG. 8, without physically writing $D_4$ and $D_8$ again.

Figure 9:
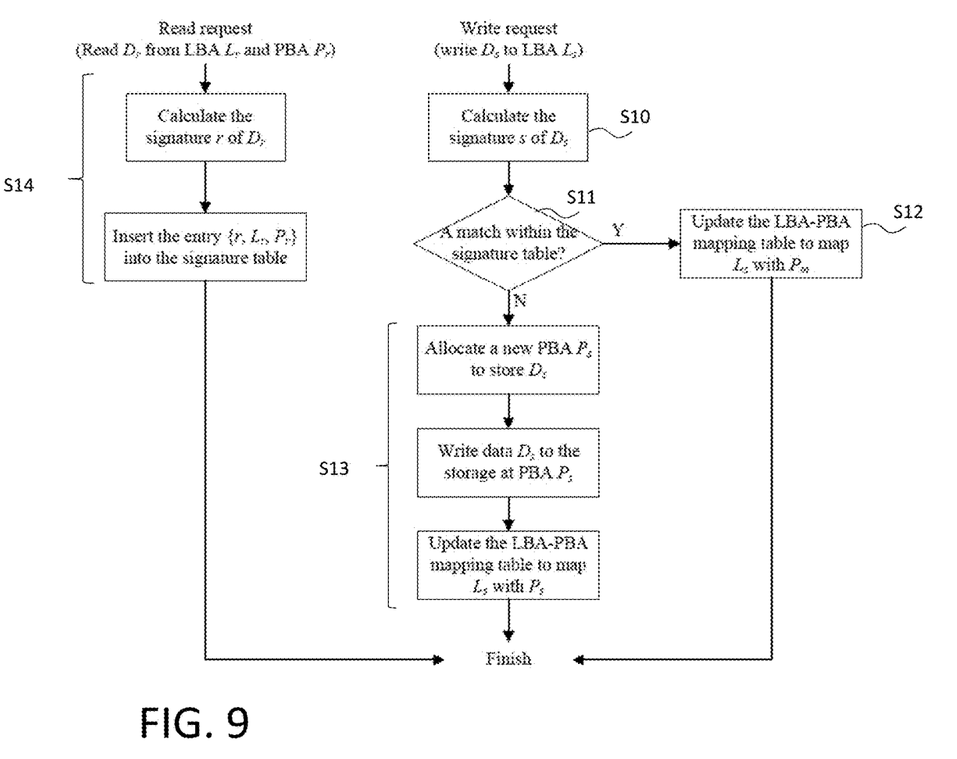
FIG. 9 illustrates the data flow diagram of the enhanced FTL for eliminating the GC-induced redundant write.

FIG. 9 shows the flow diagram of the enhanced FTL on eliminating the redundant write invoked by the GC process. The FTL maintains a very small signature table (e.g., 512 entries), in which each entry contains an LBA, the signature of the data being stored at this LBA, and the corresponding PBA. Although the data being stored at each LBA has a large size (e.g., 4 kB), its signature has very small size, e.g., 16 B or 20 B. The signature can be obtained by hashing (e.g., SHA-1) and must ensure a sufficiently low probability (e.g., $10^{-20}$ and below) that two sectors with the same signature do not have the identical content.

Beginning at S10, upon a write request to a specified LBA $L_s$, FTL first calculates the signature (denoted as s) of its content, and looks-up the signature table for a possible signature match at S11. If there is a signature match (i.e., the signature of one existing entry in the table is identical to s) in which $L_m$ and $P_m$ denote the LBA and PBA of this matching entry, the FTL directly updates the LBA-PBA mapping table to map specified LBA $L_s$ with existing PBA $P_m$ without physically writing the data to flash memory at S12. Otherwise, if no signature match is found at S11, then at S13, FTL allocates an available sector with a new PBA $P_s$, writes the incoming data to $P_s$, and update the LBA-PBA mapping table to map $L_s$ with $P_s$.

When handling read requests, e.g., from a specified LBA $L_r$ for an associated PBA $P_r$, the enhanced FTL inserts new entries into the signature table. During a read operation, a signature r is calculated for $D_r$ at S14 and the entry r, $L_r$, $P_r$ is inserted into the signature table at S14.

Figure 10:
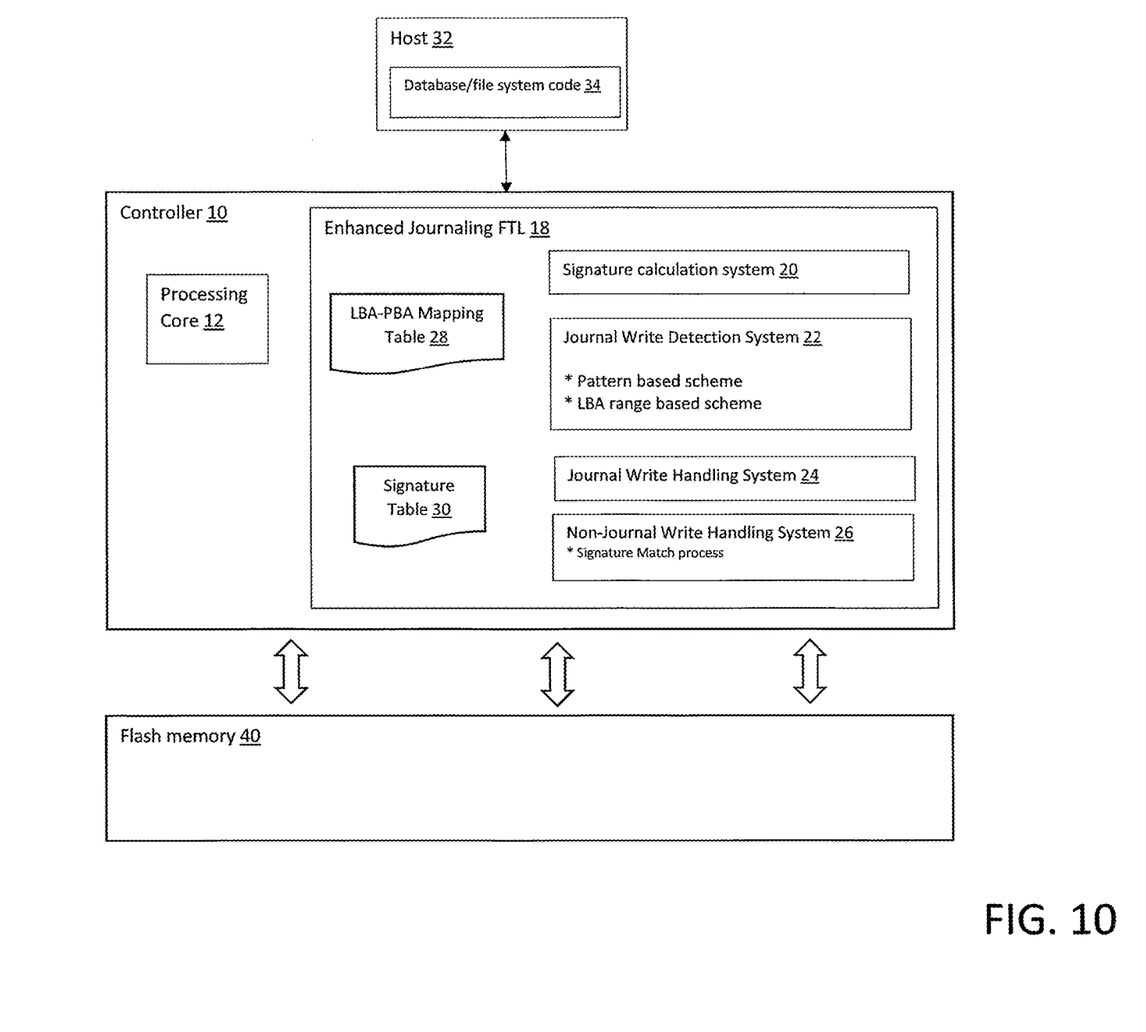
FIG. 10 illustrates an enhanced journaling FTL in accordance with an embodiment of the invention.

FIG. 10 depicts an enhanced journaling FTL 18 that resides in a controller 10 between the host 32 and flash memory 40 and includes, e.g., a customary LBA-PBA mapping table 28. Also included is a signature table 30 for storing signatures of stored data blocks. Enhanced journaling FTL 18 implements the processes described above in FIGS. 2-6 without modifying any of the database/file system code 34 in host 32. As such, the enhanced operations of FTL 18 are transparent to the host 32. Enhanced journaling FTL 18 may for example be implemented with a processing core 12 using FPGA (field programmable gate array) technology, ASIC technology, firmware, software or any other known system. Controller 10 may for example reside on a controller card that plugs into a server or other peripheral to manage flash memory 40 (or other SSD types).

In this illustrative embodiment, enhanced journaling FTL 18 includes: a signature calculation system 20 that calculates and stores a signature of a data block being written to flash memory 40 from host 32; a journal write detection system 22 that determines whether the data write operation is a journal write or a non-journal write operation; a journal write handling system 24 that handles data journal write operations; and a non-journal write handling system 26 that handles non-journal write operations.

As noted above, signature calculation system 20 may be implemented using any technique for capturing a signature from a data block (e.g., SHA-1 hashing). Once the data block signature is calculated, journal write detection system 22 determines whether the write operation is a journal or non-journal operation using, e.g., a pattern based scheme or an LBA range based scheme, which are described above in FIGS. 5 and 6, respectively. Because the host 32 does not inform the enhanced journaling FTL 18 which type of operation is being implemented, an internal scheme is utilized. Journal write handling system 24 is described above in S3 of FIG. 4. Non-journal write handling system 26 utilizes a signature match process (described in S4 of FIG. 4) to determine if the data block matches a stored block. If there is no match, described steps S5 are implemented; otherwise the LBA-PBA mapping table 28 is simply updated as described in S6 of FIG. 4.

Figure 11:
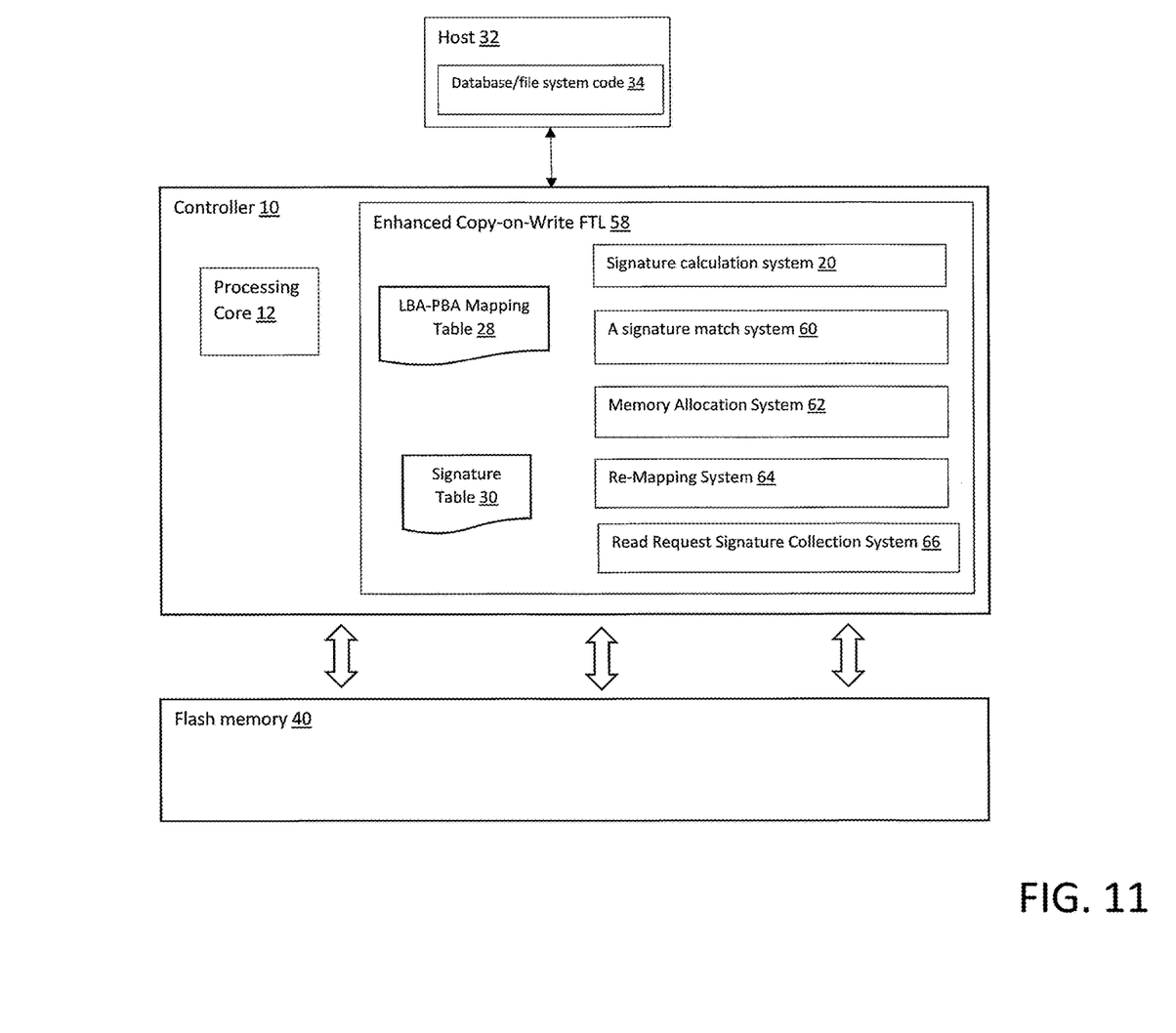
FIG. 11 illustrates an enhanced journaling copy-on-write FTL in accordance with an embodiment of the invention.

FIG. 11 depicts an enhanced copy-on-write FTL 58 that resides in a controller 10 between the host 32 and flash memory 40 and includes, e.g., a customary LBA-PBA mapping table 28. Also included is a signature table 30 for storing signatures of stored data blocks. Enhanced journaling FTL 18 implements the processes described above in FIGS. 7-9 without modifying any of the database/file system code 34 in host 32. As such, the enhanced operations of FTL 58 are transparent to the host 32. Enhanced copy-on-write FTL 18 may for example be implemented with a processing core 12 using FPGA (field programmable gate array) technology, ASIC technology, firmware, software or any other known system. In this illustrative embodiment, enhanced copy-on-write FTL 58 includes: a signature calculation system 20 that calculates and stores a signature of a data block being written to flash memory 40 from host 32; a signature match system 60 that determines if the calculated signature resides in the signature table 30; a memory allocation system (shown as S13 in FIG. 9) for allocating a new PBA, storing data, and updating mapping table 28 if no match occurs; and a re-mapping system 64 (shown as S12 in FIG. 9) that maps the specified LBA to an existing PBA if a match occurs.

Note that enhanced journaling FTL 18 and enhanced copy-on-write FTL 58 could reside on the same controller card and be pre-configured based on the type of database/file system (journaling or copy-on-write) being deployed by host 12.

It is understood that the enhanced FTLs 18, 58 may be implemented in any manner, e.g., as an integrated circuit board that includes a processing core 12, I/O and processing logic. Processing logic may be implemented in hardware/software, or a combination thereof. For example, some of the aspects of the processing logic may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions or other computing logic systems.

These program logic may be executed by a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, it is understood that the enhanced FTL logic 18, 58 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A controller, comprising:
  an enhanced flash translation layer (FTL) configured to process data transfers between a host that deploys a journaling scheme and a solid state drive (SSD) memory, the enhanced FTL comprising:
    a signature calculation system that calculates a signature of a data block during a data write operation, wherein the data write operation includes writing the data block to a specified logical block address (LBA);

a journal write detection system that detects whether the specified LBA is within a journal region formed by a continuous and fixed range of LBAs;

a journal write handling system that, in response to the specified LBA being within the journal region, allocates a new physical block address (PBA), writes the data block to the new PBA, updates a mapping table with a new LBA-PBA mapping that maps the specified LBA to the new PBA, and inserts the signature into a signature table for the new LBA-PBA mapping; and a non-journal write handling system that, in response to the specified LBA being outside of the journal region, maps the specified LBA to an existing PBA if the signature matches a stored signature in the mapping table.

2. The controller of claim 1, wherein in response to the specified LBA being outside of the journal region and the signature not matching a stored signature in the mapping table, the non-journal write handling system allocates another new PBA, writes the data block to the another new PBA, and updates the mapping table to map the specified LBA to the another new PBA.

3. The controller of claim 1, wherein the SSD memory comprises flash memory.

4. The controller of claim 1, wherein the signature is calculated with a hash function.

5. The controller of claim 1, wherein the journal write detection system employs a pattern based scheme in which sequential writes are identified as targeting the journal region.

6. The controller of claim 1, wherein the journal write detection system employs an LBA range based scheme in which the journal region is determined by analyzing a data structure of a database/file system being employed by the host.

7. The controller of claim 1, wherein the journal write detection system employs an LBA range based scheme in which the journal region is determined by utilizing on-line learning to monitor write requests over a period of time.

8. A method of implementing an enhanced flash translation layer (FTL), comprising:

processing a data write operation from a host that deploys a journaling scheme, wherein the data write operation includes writing a data block to a specified logical block address (LBA) that maps to a physical block address (PBA) in a solid state drive (SSD) memory;

calculating a signature of the data block;

detecting whether the specified LBA is within a journal region formed by a continuous and fixed range of LBAs;

in response to the specified LBA being within the journal region, allocating a new PBA, writing the data block to the new PBA, updating a mapping table with a new LBA-PBA mapping that maps the specified LBA to the new PBA, and inserting the signature into a signature table for the new LBA-PBA mapping; and in response to the specified LBA being outside of the journal region, mapping the specified LBA to an existing PBA if the signature matches a stored signature in the mapping table.

9. The method of claim 8, wherein, in response to the specified LBA being outside of the journal region and the signature not matching a stored signature in the mapping table, allocating another new PBA, writing the data block to the another new PBA, and updating the mapping table with a new LBA-PBA mapping to map the specified LBA to the another new PBA.

10. The method of claim 8, wherein the SSD memory comprises flash memory.

11. The method of claim 8, wherein the signature is calculated with a hash function.

12. The method of claim 8, wherein detecting whether the specified LBA is within a journal region formed by a continuous and fixed range of LBAs includes employing a pattern based scheme in which sequential writes are identified as targeting the journal region.

13. The method of claim 8, wherein detecting whether the specified LBA is within a journal region formed by a continuous and fixed range of LBAs includes employing an LBA range based scheme in which the journal region is determined by analyzing a data structure of a database/file system being employed by the host.

14. The method of claim 8, wherein detecting whether the specified LBA is within a journal region formed by a continuous and fixed range of LBAs includes employing an LBA range based scheme in which the journal region is determined by utilizing on-line learning to monitor write requests over a period of time.

* * * * *